T. J. VOLLKOMMER.
RECUPERATOR.
APPLICATION FILED DEC. 11, 1919.

1,402,325.

Patented Jan. 3, 1922.
2 SHEETS—SHEET 1.

WITNESSES
J. Herbert Bradley.
Jo. Baily Brown.

INVENTOR
Theodore J. Vollkommer
by Winter & Brown
his Attorneys

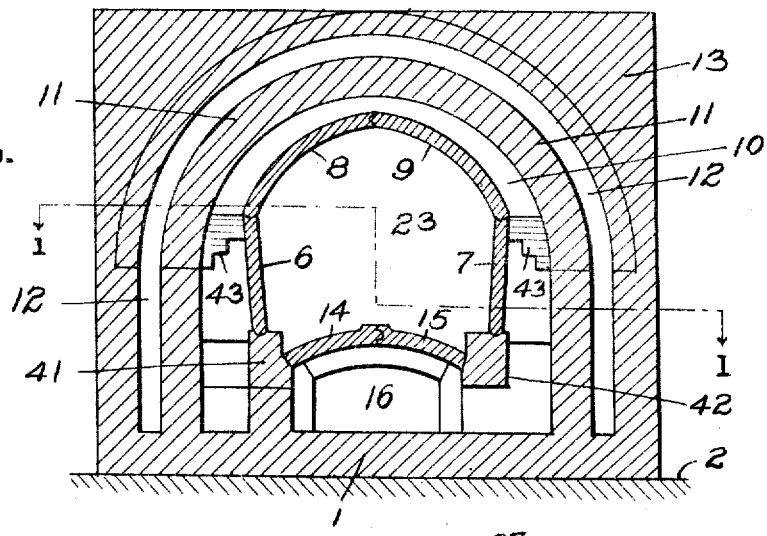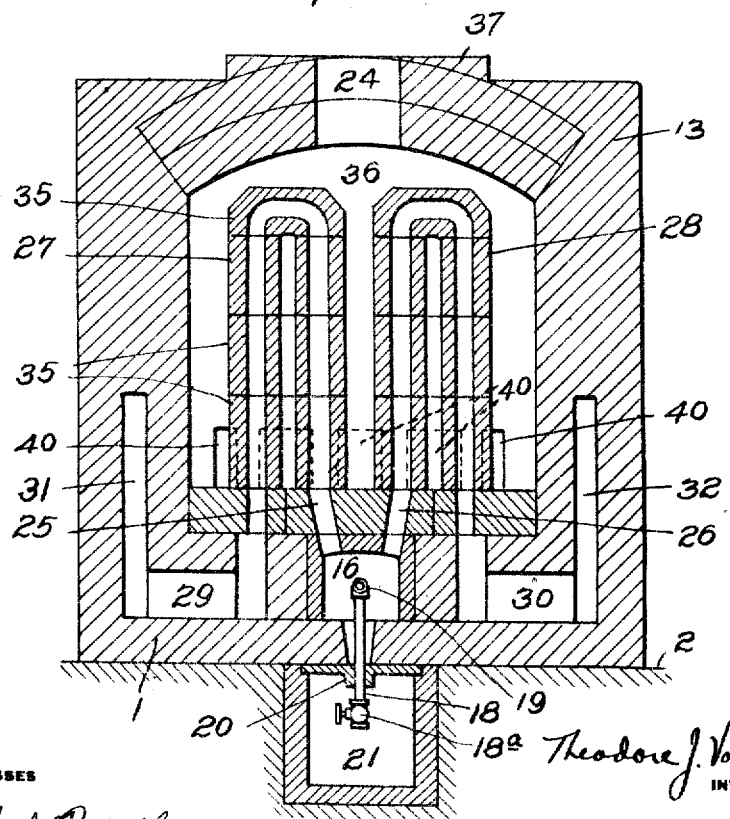

UNITED STATES PATENT OFFICE.

THEODORE J. VOLLKOMMER, OF PITTSBURGH, PENNSYLVANIA.

RECUPERATOR.

1,402,325.

Specification of Letters Patent.   Patented Jan. 3, 1922.

Application filed December 11, 1919. Serial No. 344,056.

*To all whom it may concern:*

Be it known that I, THEODORE J. VOLLKOMMER, a resident of Pittsburgh, in the county of Allegheny and State of Pennsylvania, have invented a new and useful Improvement in Recuperators, of which the following is a specification.

This invention relates to muffle furnaces, and particularly to apparatus for preheating air supplied to the combustion chamber of such furnaces. Among the special forms of construction it is intended to provide both a furnace wall and a preheating passage for the air which will be so constructed as to withstand expansion and contraction on account of changes in temperature to which such structures are subjected. Preheating passages for the air are provided directly in the path of the burnt gases, in the flue, and yet accessible for inspection and repair.

Figure 1:
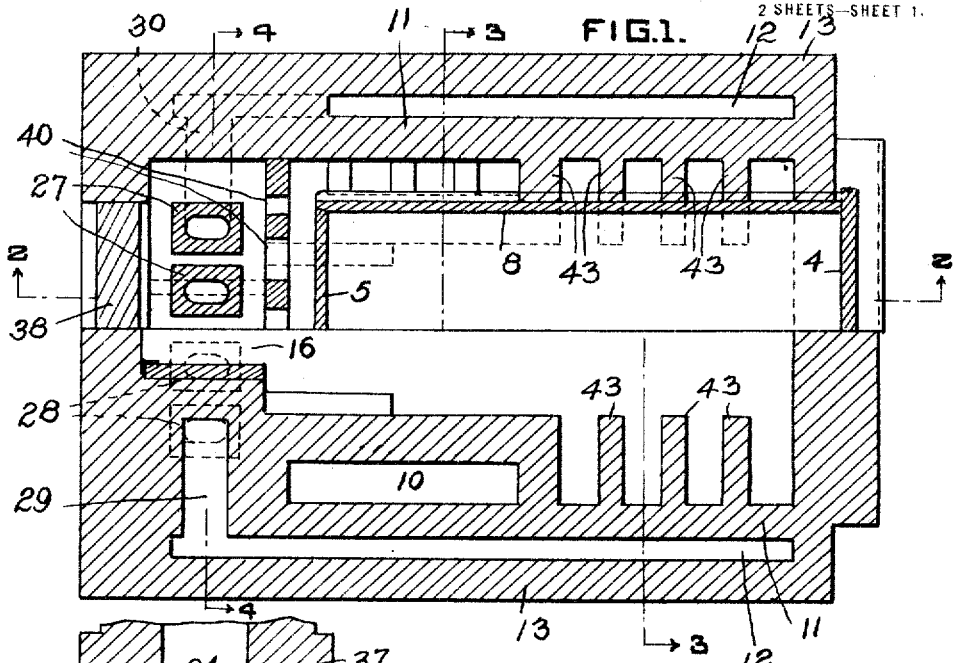
Figure 2:
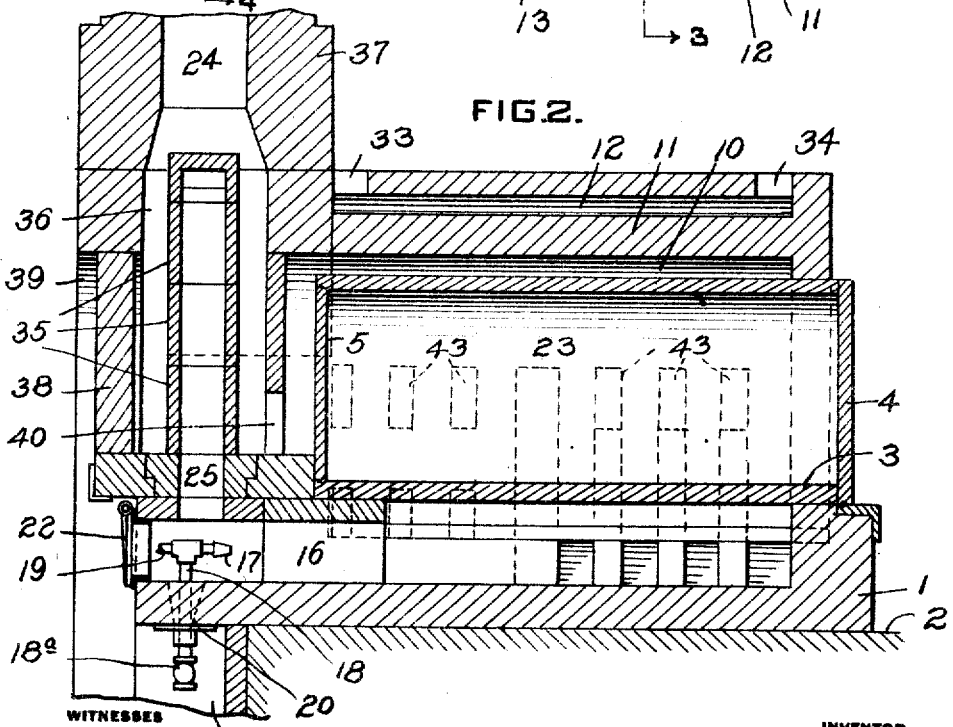

Referring to the drawings Fig. 1 is a section through the furnace on line 1—1 of Fig. 3; Fig. 2 is a vertical section on line 2—2 of Fig. 1; Fig. 3 is a vertical cross-section on the line 3—3 of Fig. 1; and Fig. 4 is a vertical section on the line 4—4 of Fig. 1.

In muffle furnaces designed for preheating billets or other metallic articles, the main heating chamber is surrounded by a combustion chamber in which heat is generated by the burning of a gas, or other suitable fuel. In any case air must be supplied to support the combustion, and a great deal of heat may be conserved by preheating the air before introducing it to the combustion chamber. This may be done by leading the air through passages surrounding or leading through the combustion chamber, before introducing it thereto.

The walls of a muffle furnace are subjected to extreme heat, and when the furnace is not in use they are allowed to partially cool, thereby resulting in expansion and contraction which tends to crack the material of which the walls are made. The construction described in the present specification is designed to obviate this danger, as will more fully appear hereinafter.

The furnace illustrated herein as embodying the present invention comprises a base 1 seated upon foundation 2, and supporting the bottom 3 of the heating or muffle chamber, which has a door 4, an end wall 5, and is built up of side walls 6 and 7, connected by two or more top arch members 8 and 9, resting on the side walls, as more fully described hereinafter. Surrounding the heating chamber is the combustion chamber 10, which is enclosed by an intermediate wall 11, which in turn is surrounded by a space 12, formed between the wall 11 and the outer wall 13 of the whole furnace construction. The heating chamber has a suitable bottom preferably formed by arched cooperating members 14 and 15. It will be understood that all of the walls of the heating chamber are made of sufficiently refractory material. The combustion chamber 10 extends entirely around the heating chamber, and is directly connected to the mixing and combustion chamber 16, situated beneath the heating compartment.

Fuel is supplied to the combustion and mixing chamber 16 by means of nozzle 17, connected by pipe 18 to a source of fuel, such as gas, oil, etc. An additional pipe 19 is connected to the nozzle for mixing and feeding the fuels. This may carry air, steam, another gas, etc. The nozzle is supported by a casting 20 mounted under the base 1 of the whole furnace structure. Controlling valves 18ª and connections to the pipe 18 are located in pit 21, underneath the base of the furnace. A hinged door 22 is provided near the nozzle to permit inspection and adjustment thereof from the outside of the furnace. Fuel is forced through the nozzle 17 under considerable pressure into the combustion chamber 16, which extends under and around the walls of the heating chamber 23.

Air to be mixed with the fuel, and to support the combustion thereof is constantly drawn by the exhaust about the nozzle 17, and also by the draught through the main flue 24 of the furnace stack, through the passages 25 and 26, which extend through the U-shaped preheating members 27 and 28, and thence by lateral passages 29 and 30, 31 and 32 in the side walls into the space 12, surrounding the wall 11, as shown in Fig. 3. This space 12 has external openings 33 and 34 at its top, through which the air is drawn.

The preheating tubes 27 and 28 are formed of a series of hollow tiles 35, seated one upon the other, and it will be observed that these members are situated in the compartment 26, which is a part of the flue 24, leading out through stack 37 of the furnace. The joints between the tiles are all horizontal, therefore the clay therein does not fall out under the expansion and contraction of the tiles, as is the case with vertical joints.

Therefore air to support the combustion about the heating chamber is drawn through openings 33 and 34 into the compartment 12, which extends entirely around the furnace wall 11, which in turn extends entirely around the combustion chamber 10. Therefore the air is exposed to the entire heated surface of the wall 11 which encloses the burning gases. Consequently the air is considerably warmed in its passage around said wall to openings 29, 30, 31 and 32 by which it is led from compartment 12 into the outer ends of the U-shaped passages through the member 27 and 28. In passing through these latter members it is still further heated, since they lie entirely within the stack through which the heated flue gas passes in its escape from the combustion chamber. Air is therefore delivered preheated to the combustion chamber at a point just above the nozzle 17. The result is a recuperator of great efficiency.

The making of the U-shaped preheating members 27 and 28, which are situated directly in the path of the hot flue gases, of sections seated one upon the other, permits these members to readily expand and contract, without cracking, and without injury to the structure. Their position insures their exposure to the maximum heat of the waste gases, which entirely surround them, and also permits their ready inspection by knocking out the temporary wall 38, used to seal up the opening 39, which is provided in the furnace wall at the foot of the stack. The heated flue gases pass out of the combustion chamber through openings 40, and come directly in contact with the base of these U-shaped members and pass therearound before going up to the flue 24, from which they escape to the atmosphere.

In order to take care of the very severe strains which are imposed upon the walls of the heating compartment 23, that member is preferably made with a bottom of two arch members 14 and 15, having an interlocking tongue and groove at their point of contact, and seated upon base members 41 and 42 of the main furnace construction. The sides are formed by slabs of refractory material 6 and 7, which seat at their lower ends upon the said members 41 and 42, and which incline outwardly, leaning against supports 43 built out from the main wall 11 of the combustion chamber. Seating upon the tops of the side walls 6 and 7, in a groove formed by the top of that member and the end of supports 43, two curved top members 8 and 9 are provided, which are joined together by a tongue and groove arrangement along the line of their contact. Thus it will be seen that the entire wall of the heating chamber is free to expand and contract, and that the parts thereof may readily adjust themselves to such expansion and contraction, without breaking any joints, and without breaking the structure as a whole. This is a very important feature, as is also the provision of the U-shaped tubes 27 and 28 of a form which permits free expansion and contraction without breaking.

I claim:

1. In a recuperative furnace construction a preheating passage for supplying air to the combustion chamber, said passage leading around the walls of the combustion chamber and through a conduit situated in the furnace stack.

2. In a furnace construction means for preheating air supplied to the combustion chamber, said means comprising vertical air conduits arranged entirely inside the furnace stack in the path of the gases of combustion.

3. In a recuperative furnace construction the provision of air conduits situated in the path of the gases of combustion, said conduits being formed of independent sections seated one upon another.

4. In a recuperative furnace construction conduits for supplying air to the combustion chamber, said conduits comprising inverted U-shaped hollow tile members seated on the bottom of the furnace stack and freely exposed to the heat of the escaping gases.

5. In a muffle furnace construction a heating chamber having its walls formed of slabs of refractory material seating loosely one upon the other and held in position by gravity.

6. In a muffle furnace construction a heating chamber having its side walls formed by loosely mounted slabs standing on edge and inclined outwardly, and its top formed by arch members seated upon the top of the side members, and held in position by gravity.

7. In a muffle furnace construction a heating chamber having its side walls formed from slabs of refractory material seated upon edge and inclined outwardly against supports from the side walls of the combustion chamber, and a top from the heating chamber composed of slab members seated loosely upon the tops of the side members, whereby to permit free expansion and contraction of the walls of the heating chamber.

8. In a furnace construction, air conduits situated in the path of the gases of combustion, said conduits being formed by independent horizontal hollow sections seated one upon the other.

9. In a furnace construction, air conduits situated in the path of the gases of combustion, said conduits being formed of associated sections with horizontal joints therebetween.

In testimony whereof I have hereunto set my hand.

THEODORE J. VOLLKOMMER.

Witness:
ALICE A. TRILL.